United States Patent [19]

Terashima et al.

[11] Patent Number: 5,491,684
[45] Date of Patent: Feb. 13, 1996

[54] OPTICAL DISK UNIT

[75] Inventors: Yuji Terashima; Takashi Haruguchi; Hirohiko Ohwaki; Yoshinobu Soeda, all of Fukuoka, Japan

[73] Assignee: Matsushita Electric Industrial Co., Ltd., Osaka, Japan

[21] Appl. No.: 221,929

[22] Filed: Apr. 1, 1994

[30]     Foreign Application Priority Data

Apr. 2, 1993 [JP] Japan .................................. 5-076623
Jul. 20, 1993 [JP] Japan .................................. 5-179189

[51] Int. Cl.⁶ .......................... G11B 21/02; G11B 21/12
[52] U.S. Cl. ...................... 369/219; 369/44.14; 369/249
[58] Field of Search ........................... 369/44.11, 44.14, 369/44.15, 44.16, 215, 219, 220, 221, 244, 249

[56]              References Cited

U.S. PATENT DOCUMENTS 5,018,033   5/1991   Miyazaki et al. .................. 360/106
5,214,630   5/1993   Goto et al. ....................... 369/44.14

FOREIGN PATENT DOCUMENTS

| | | | |
|---|---|---|---|
| 58-3142 | 1/1983 | Japan | 369/44.11 |
| 62-200538 | 9/1987 | Japan | 369/44.11 |
| 62-257635 | 11/1987 | Japan | 369/44.14 |
| 2-68730A | 3/1990 | Japan . | |
| 2308428 | 12/1990 | Japan | 369/44.11 |
| 4-64929 | 2/1992 | Japan | 369/44.11 |
| 5-6558 | 1/1993 | Japan | 369/44.14 |
| 5166212 | 7/1993 | Japan | 369/44.16 |

*Primary Examiner*—Robert S. Tupper
*Assistant Examiner*—William J. Klimowicz
*Attorney, Agent, or Firm*—Spencer & Frank

[57]                ABSTRACT

There is disclosed an optical disk unit. Optical parts, including a laser unit and objective, are integrally mounted on a bobbin, and focusing coils and tracking and feed coils are mounted on the bobbin. The bobbin is resiliently supported, and is slidable along guide shafts extending radially of an optical disk loaded on the optical disk unit. The bobbin is moved by the focusing coils and the tracking and feed coils, thereby effecting a focusing drive, a tracking drive and a feed drive. With this construction, the optical disk unit can be compact in size, and light in weight.

3 Claims, 17 Drawing Sheets

OPTICAL DISK UNIT

BACKGROUND OF THE INVENTION

1. Field of the Invention

This invention relates to an optical disk unit which reads information from a recording medium, such as an optical disk and a opto-magnetic disk, or reads and writes information relative to such a recording medium.

2. Description of Related Art

Recently, optical disk units have become compact and thin in size, and are of a high performance design so that they can be mounted on a smallsize information processing device.

A conventional optical disk unit will now be described. FIG. 20 is a view showing important portions of the conventional optical disk unit, and FIG. 21 is a view showing a pickup head of the conventional optical disk unit. As shown in FIG. 20, the optical disk unit comprises a spindle motor 2 for rotating an optical disk (recording medium) 1, a fixed optical portion 3 and a movable optical portion 4 which reproduce data stored in the optical disk 1, or record and reproduce such data, and a feed portion 5 for moving the movable optical portion 4 in a direction radially of the optical disk 1. A laser beam emitting means for applying a laser beam to the optical disk 1, a photo detector means for detecting the light or beam reflected from the optical disk 1, and other optical parts are mounted on the fixed optical portion 3. Optical parts which direct the laser beam, applied from the fixed optical portion 3 to the optical disk 1, and also condense or converge the laser beam, a focusing drive means, and a tracking drive means are mounted on the movable optical portion 4. In FIG. 21, an objective lens 6 for converging the laser beam, emitted from the fixed optical portion 3, onto the optical disk 1, a bobbin 7 supporting an objective lens 6, focusing coils 8 and tracking coils 9 are mounted on the bobbin 7. The bobbin 7 is resiliently supported by suspension springs 10 for movement in a focusing direction (direction of an arrow A) and a tracking direction (direction of an arrow B) relative to a head base 11. Opposite ends of each suspension spring are fixedly secured to the head base 11 and the bobbin 7, respectively. A pair of magnets 12 are fixedly mounted on the head base 11 in opposed relation to the focusing coils 8 and the tracking coils 9. The pickup head shown in FIG. 21 is mounted on a carriage base 13 shown in FIG. 20, and guide rollers 14 mounted on the carriage base 13 are held in engagement with two guide shafts 15, so that the pickup head is slidable, together with the carriage base 13, in a direction radially of the optical disk 1. Feed magnets 16 are fixedly mounted respectively on back yokes 17 of a ferromagnetic material. An opposed yoke 18 made of a ferromagnetic material is provided in opposed relation to a respective one of the feed magnets 16. The feed magnet 16, the back yoke 17 and the opposed yoke 18 jointly constitute a magnetic circuit of the feed portion 5. A pair of feed coils 19 are mounted on the carriage base 13, and the opposed yokes 18 extend through these feed coils 19, respectively.

The operation of the optical disk unit of the above construction will now be described. A laser beam, emitted from the laser beam emitting means mounted on the fixed optical portion 3, is directed to the objective lens 6 by an upwardly-directing mirror and other associated parts mounted on the head base 11 of the movable optical portion 4, and is converged onto the optical disk by the objective lens 6. On the other hand, reflection light from the optical disk 1 is fed via the objective lens 6 and the upwardly-directing mirror and other associated part to the photo detector means mounted on the fixed optical portion 3. Using a signal outputted from this photo detector means, data stored in the optical disk 1 is reproduced. In order to satisfactorily reproduce the data stored in the optical disk 1, the objective lens 6 needs to be moved in the focusing direction (direction of the arrow A) and the tracking direction (direction of the arrow B) so as to accurately converge the laser beam, emitted from the laser beam emitting means mounted on the fixed optical portion 3, onto the optical disk 1. With respect to the movement of the objective lens 6 in the focusing direction, the focusing drive is effected by an electromagnetic effect, achieved by the focusing coils 8 and the magnets 12, against the bias of the suspension springs 10. With respect to the movement in the tracking direction, the tracking drive is similarly effected by an electromagnetic effect achieved by the tracking coils 9 and the magnets 12. The carriage base 13 is moved along the guide shafts 15 by an electromagnetic effect achieved by the feed coils 19 and the feed magnets 16. By thus driving the carriage base 13, a feed drive is effected such that the objective lens 6 moves over an entire data area of the optical disk 1.

By the above focusing drive, tracking drive and feed drive, the laser beam, emitted from the fixed optical portion 3, is accurately converged onto a required position of the optical disk 1 through the objective lens 6.

In the above conventional construction, however, the carriage base 13 is of such a construction that the opposite sides thereof are disposed close to the pair of guide shafts 15, respectively, and therefore the carriage base 13 is large in size and heavy in weight. As a result, the carriage base 13 can not be driven at high speed in the tracking direction. Further, two drive portions are required, that is, the tracking drive portion constituted by the tracking coils 9 and the magnets 12 for moving only the bobbin 7, having the objective 6 mounted thereon, in the tracking direction and the feed drive portion constituted by the feed coils 19 and the feed magnets 16 for moving the entire movable optical portion 4, including the carriage base 13, in the tracking direction. Thus, the number of component parts increases, and therefore it is difficult to provide a small-size design and to reduce the cost. Further, since the fixed optical portion 3 is separate from the movable optical portion 4, it has been necessary to achieve such a positional accuracy that the laser beam, emitted from the laser beam emitting means, can be directed to the objective lens 6. Thus, high precision of the parts and means for making adjustments during assembly are required. Furthermore, in the magnetic circuit constituted by the magnets 12, the focusing coil 8 and the tracking coil 9 are disposed in overlapping relation to each other, and therefore a gap in the magnetic circuit is increased by an amount corresponding to the thickness of this overlap, which has resulted in decreasing the efficiency with which the actuator is driven.

SUMMARY OF THE INVENTION

With the above problems of the conventional construction, it is an object of this invention to provide an optical disk unit which is compact in size, less costly, and high in reliability.

According to the present invention, there is provided an optical disk unit comprising:

light-converging means for converging light, emitted from emitting means, onto a recording medium loaded on the optical disk unit;

a bobbin having the light-converging means mounted thereon;

a pair of guide members mounted respectively on opposite sides of the bobbin for guiding the bobbin in a direction radially of the recording medium;

a pair of slide members slidably mounted on the pair of guide members, respectively;

a connecting member fixedly secured to the bobbin and the slide members to resiliently support the bobbin relative to the slide members;

focusing drive means for moving the bobbin in a direction perpendicular to the surface of the recording medium; and tracking drive means for moving the bobbin along the guide members.

The slide members mounted on the pair of guide members are connected together through the bobbin and the connecting member, and therefore the slide members, movable radially of the optical disk together with the bobbin, can be lightweight.

DESCRIPTION OF THE PREFERRED EMBODIMENTS

First Embodiment

Figure 1:
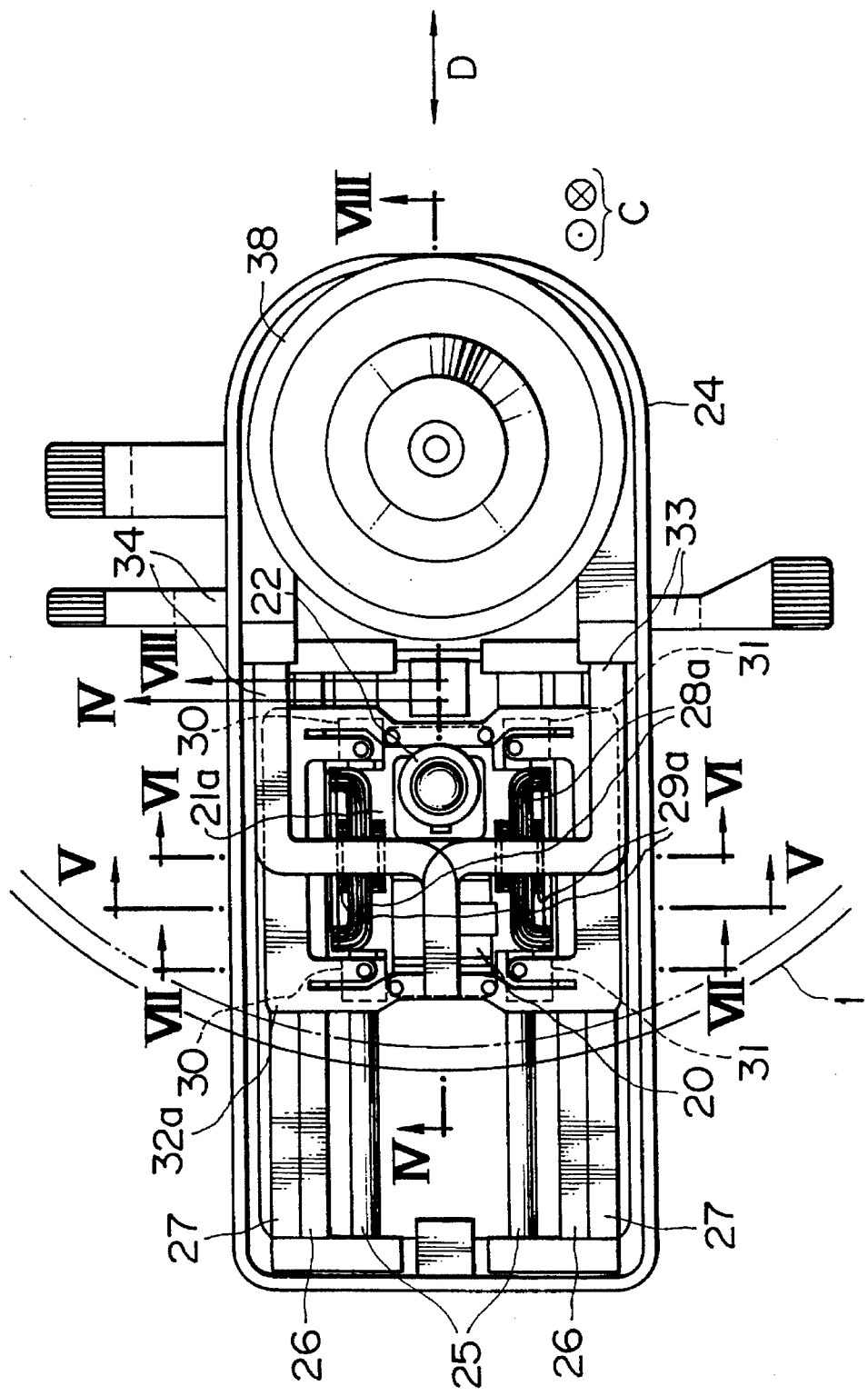
FIG. 1 is a plan view of a first embodiment of an optical disk unit of the present invention.
Figure 2:
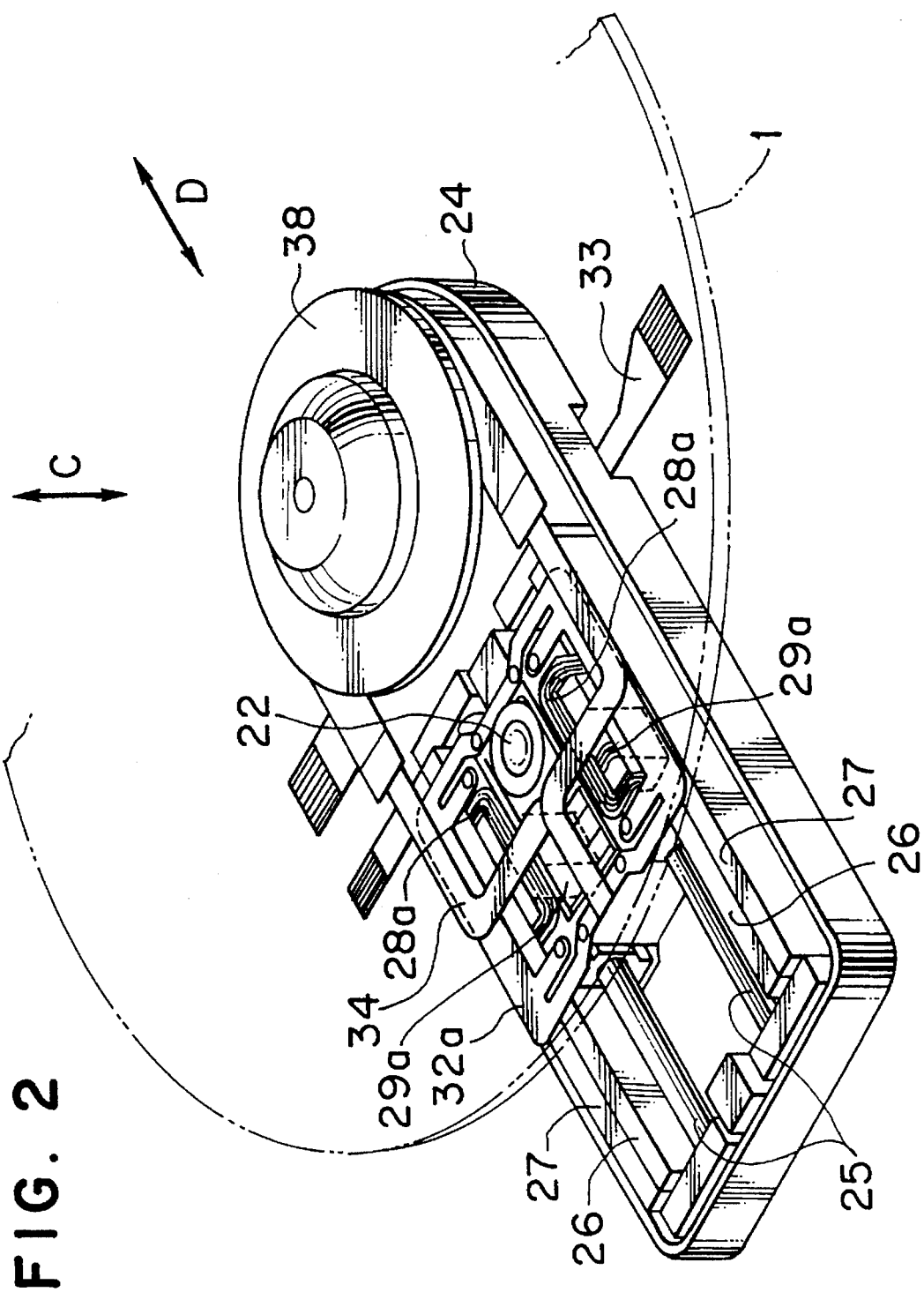
FIG. 2 is a perspective view of the optical disk of the first embodiment.
Figure 3:
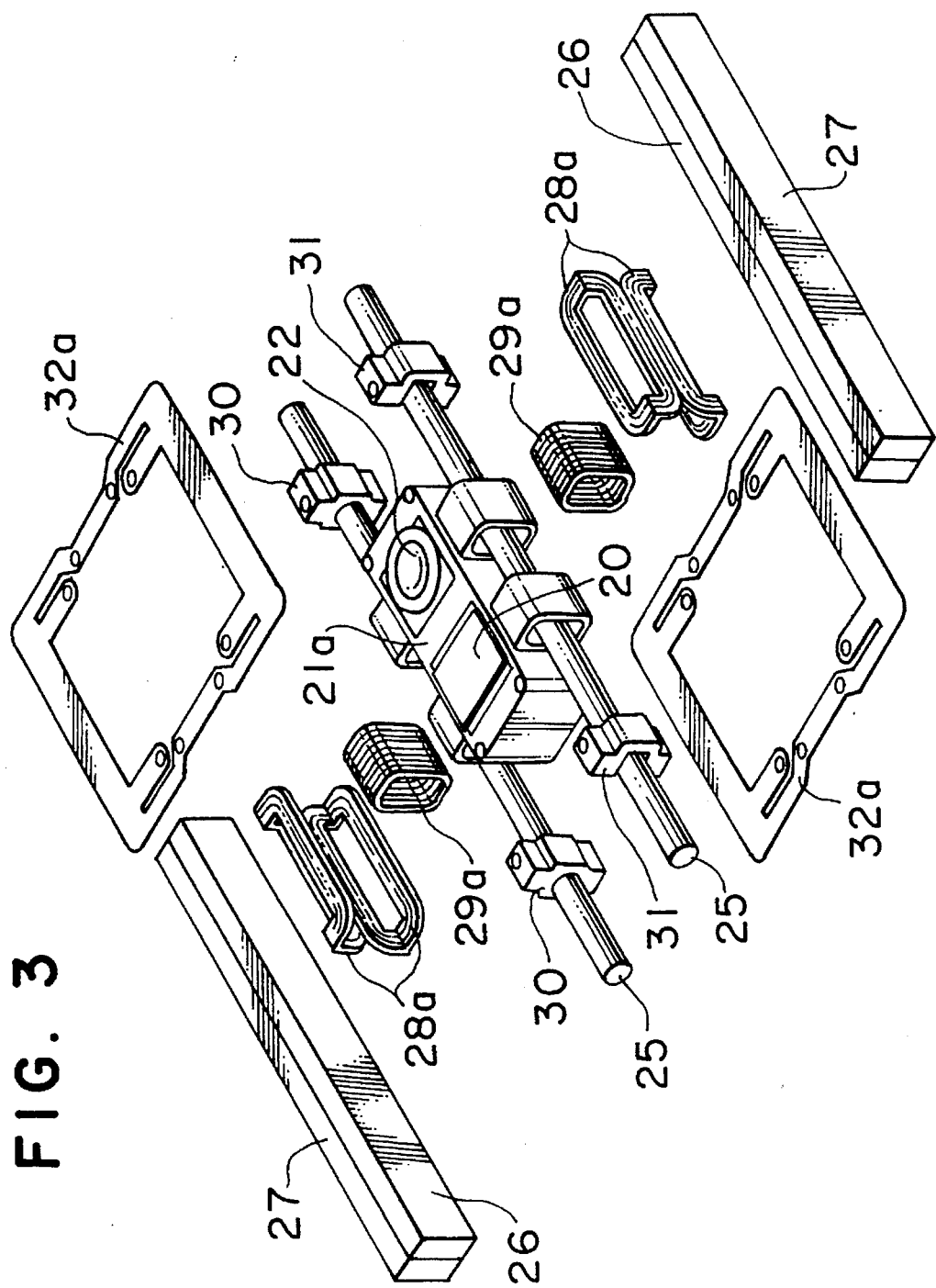
FIG. 3 is an exploded perspective view of the optical disk unit of the first embodiment.
Figure 4:
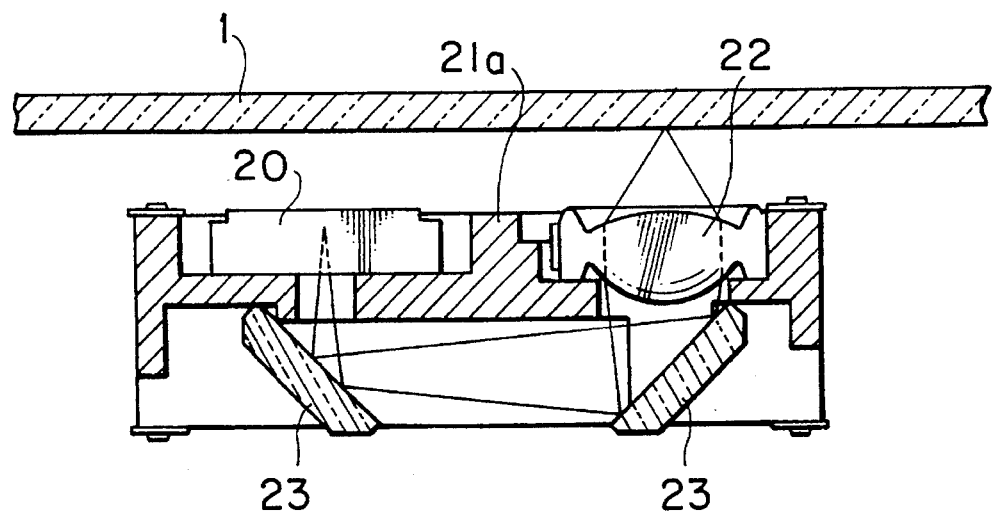
FIG. 4 is a cross-sectional view of the optical disk of the first embodiment taken along the line IV—IV of FIG. 1.
Figure 5:
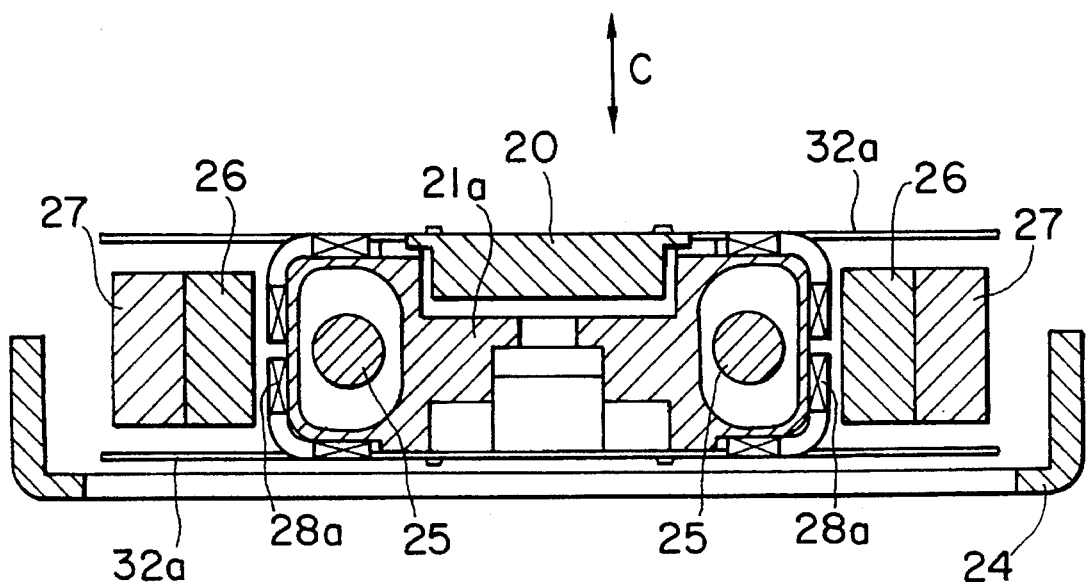
FIG. 5 is a cross-sectional view of the optical disk of the first embodiment taken along the line V—V of FIG. 1.
Figure 6:
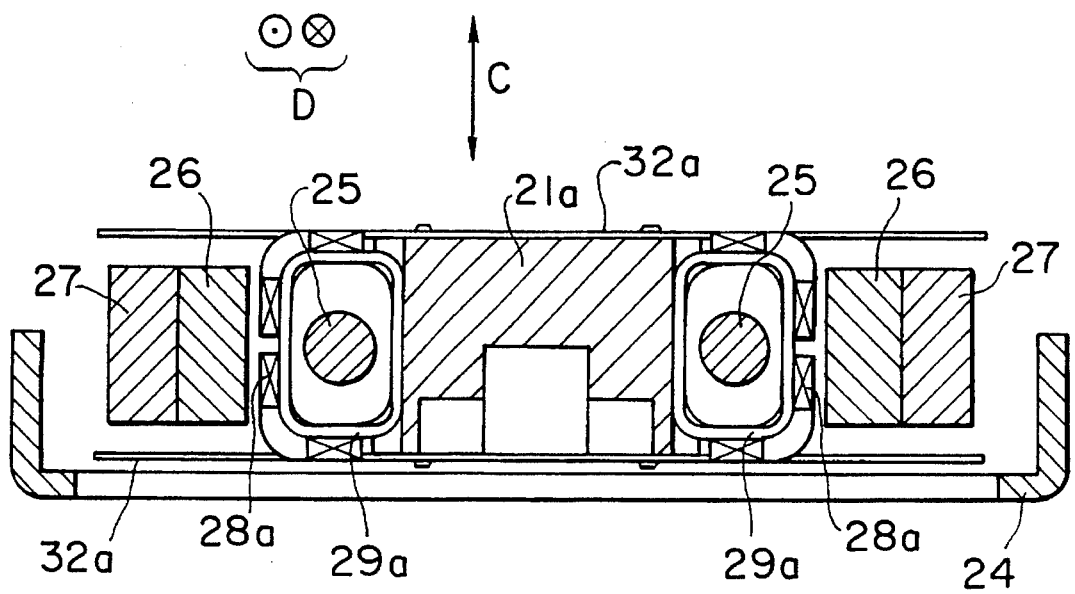
FIG. 6 is a cross-sectional view of the optical disk of the first embodiment taken along the line VI—VI of FIG. 1.
Figure 7:
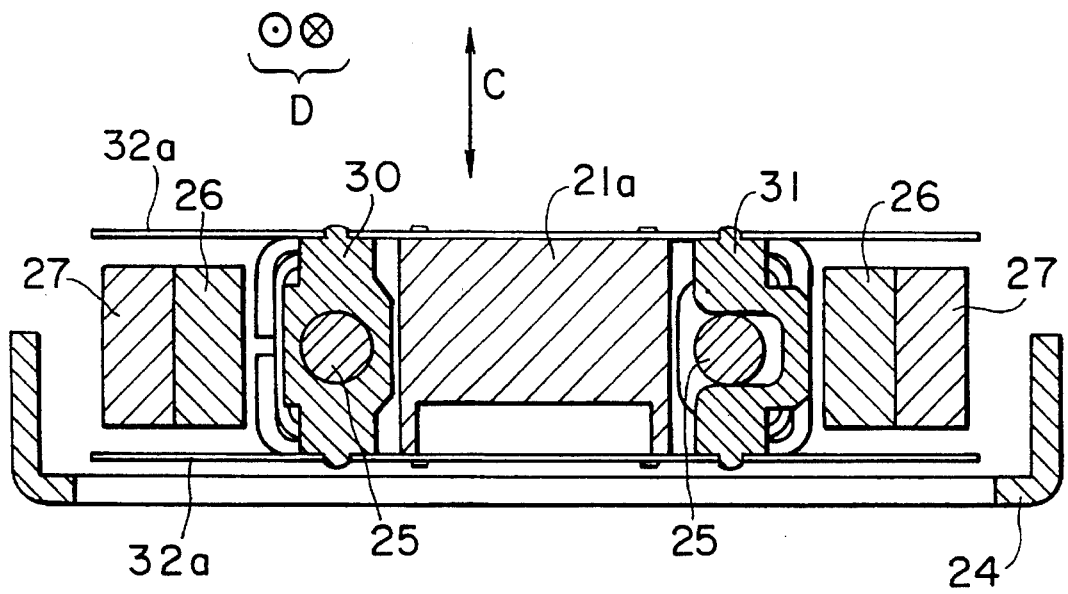
FIG. 7 is a cross-sectional view of the optical disk of the first embodiment taken along the line VII—VII of FIG. 1.
Figure 8:
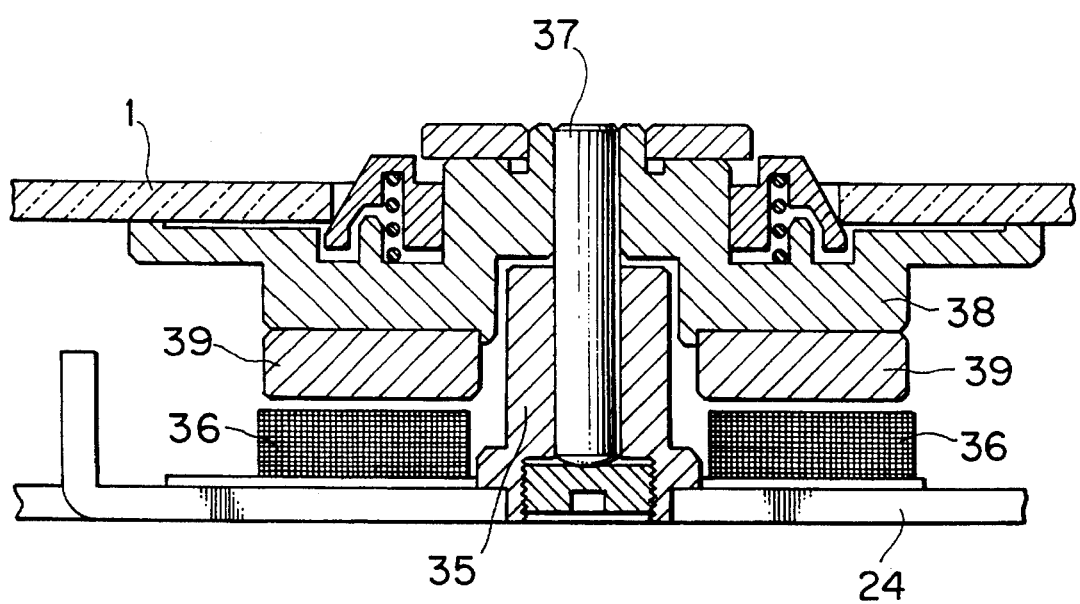
FIG. 8 is a cross-sectional view of the optical disk of the first embodiment taken along the line VIII—VIII of FIG. 1.

A first embodiment of the present invention will now be described with reference to the drawings. FIG. 1 is a plan view of the first embodiment of an optical disk unit of the present invention, FIG. 2 is a perspective view of the optical disk unit of the first embodiment, FIG. 3 is an exploded perspective view of the optical disk unit of the first embodiment, and Figs. 4, 5, 6, 7 and 8 are cross-sectional views taken along the lines IV—IV, V—V, VI—VI, VII—VII and VIII—VIII of FIG. 1, respectively. In FIGS. 1, 2 and 3, reference numeral 21a denotes a bobbin. A laser unit 20 for emitting and detecting a laser beam as shown in FIG. 4, an objective lens 22 for converging the laser beam onto an optical disk 1, and a pair of reflecting mirrors 23 (FIG. 4) for directing the laser beam, emitted from the laser unit 20, to the objective lens 22, are mounted on the bobbin 21a. Even if only one or none of the reflecting mirrors 23 is provided, a layout of the laser unit 20 and the objective lens 22 is possible. Two guide shafts 25 are mounted on a carriage base 24, and extend in a direction radially of the optical disk 1. Actuator magnets 26 for moving the bobbin 21a are mounted on the carriage base 24 in parallel relation to the guide shafts 25. A back yoke 27 made of a ferromagnetic material is fixedly secured to each of the actuator magnets 26 in contiguous relation thereto. In this embodiment, the guide shafts 25 are made of a ferromagnetic material, and with this construction, the guide shaft 25, the actuator magnet 26 and the back yoke 27 constitute a magnetic circuit. Focusing coils 28a for moving the bobbin 21a in a focusing direction (direction of an arrow C) are fixedly mounted on the bobbin 21a in opposed relation to the actuator magnets 26, as shown in FIG. 5. Tracking and feed coils 29a for moving the bobbin 21a in a tracking/feed direction (direction of an arrow D) are fixedly mounted on the bobbin 21a, and are disposed in opposed relation to the actuator magnets 26, respectively, as shown in FIG. 6, the guide shafts 25 passing through the tracking and feed coils 29a, respectively. Main shaft sliders 30 and guide sliders 31 are supported on the guide shafts 25, respectively. As shown in FIG. 7, the main shaft sliders 30 are slidable along one guide shaft 25, and the guide sliders 31 are slidable along the other guide shaft 25, and are movable along the surface of the optical disk 1 in a direction perpendicular to the axis of this guide shaft 25. Suspension springs 32a are fixedly secured to the bobbin 21a and the main shaft sliders 30 and the guide sliders 31, as shown in FIG. 7, and the bobbin 21a is resiliently supported by these suspension springs 32a for movement in the focusing direction (direction of the arrow C (FIG. 2)). A signal flexible cable 33 for transferring an electrical signal between a control board for controlling the disk unit and the laser unit 20 is connected to the laser unit 20, and is fixed to the carriage base 24. An actuator flexible cable 34 for transferring signals from the control panel to the focusing coils 28a and the tracking and feed coils 29a is connected to the focusing coils 28a and the tracking and feed coils 29a, and is fixed to the carriage base 24. As shown in FIG. 8, a spindle motor portion for rotating the optical disk 1 comprises a bearing 35 mounted on the carriage base 24, a spindle coil 36 provided around the bearing 35, a spindle shaft 37 rotatably supported by the bearing 35, a turntable 38 fixedly mounted on the spindle shaft 37 for supporting the optical disk 1, and a spindle magnet 39 mounted on the turntable 38 in opposed relation to the spindle coil 36.

The operation of the optical disk unit of the above construction will now be described. First, a laser beam, emitted from a semiconductor laser provided at the laser unit 20, is reflected by the pair of reflecting mirrors 23, and is fed to the objective lens 22, as shown in FIG. 4. The laser beam is converged or decreased in diameter by the objective lens 22 so that data can be read from the optical disk 1. Reflection light from the optical disk 1 passes through the objective lens 22, and is reflected by the reflecting mirrors 23 to a photo detector provided at the laser unit 20, and is outputted as an electrical signal.

Next, the focusing drive for detecting the data recorded on the optical disk 1 will now be described. The focusing coils 28a are located in the magnetic circuit constituted by the actuator magnet 26, the back yoke 27 and the guide shaft 25, as shown in FIG. 5. When the focusing coils 28a are energized, the bobbin 21a and the objective lens 22 (FIG. 2) are driven, together with the focusing coils 28a, in the focusing direction (direction of the arrow C) by an electromagnetic effect. At this time, since the bobbin 21a holding the objective lens 22 is supported on the main shaft by sliders 30 and the guide sliders 31 through the pair of upper and lower suspension springs 32a, the main shaft sliders 30 are angularly moved about the guide shaft 25, and the guide sliders 31 are angularly moved about the guide shaft 25, and also are moved in a direction perpendicular to the axis of the guide shaft 25, and as a result the suspension springs 32a are deformed, so that the bobbin 21a moves in the focusing direction (direction of the arrow C). When the bobbin 21a is moved in the focusing direction (direction of the arrow C), the main shaft sliders 30 are angularly moved about the guide shaft 25, and the guide sliders 31 are angularly moved about the guide shaft 25, and also move in a direction perpendicular to the axis of the guide shaft 25, and therefore the deformation of the suspension springs 32a is effected smoothly.

In this embodiment, the suspension spring 32a is formed by a leaf spring. With this construction, when the bobbin 21a is moved in the tracking/feed direction (direction of the arrow D), the suspension springs 32a are not deformed, and the tracking drive, the feed drive and the focusing drive can be effected accurately.

Figure 9:
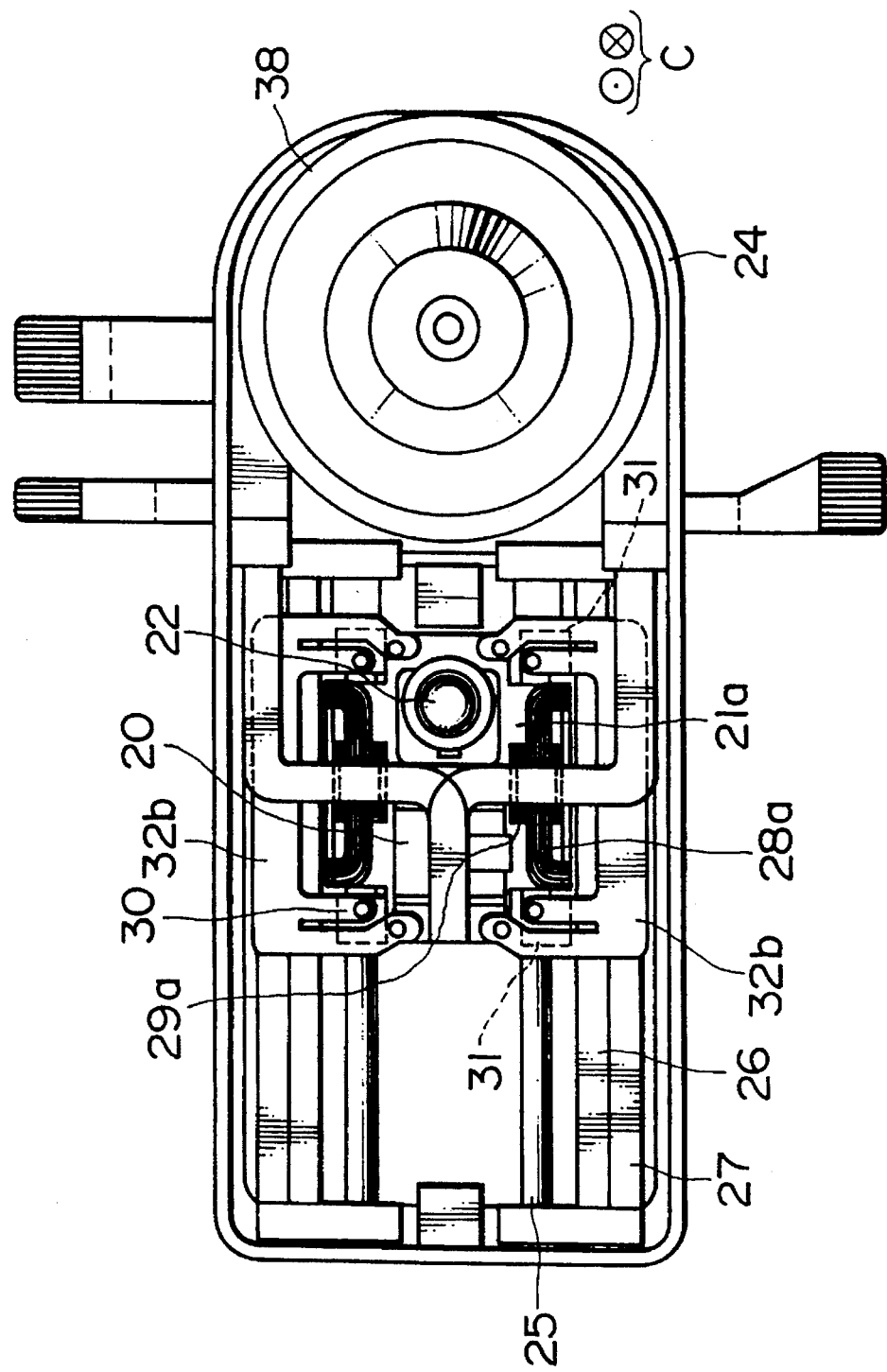
FIG. 9 is a plan view of the optical disk of the first embodiment incorporating modified suspension springs.

In the first embodiment, the suspension spring 32a is of such a construction that a spring portion, interconnecting the bobbin 21a and the main shaft sliders 30, is integral with a spring portion interconnecting the bobbin 21a and the guide sliders 31. However, this suspension spring may be of such a construction that a spring portion interconnecting the bobbin 21a and the main shaft sliders 30 is separate from a spring portion interconnecting the bobbin 21a and the guide sliders 30, as in a suspension spring 32b shown in FIG. 9.

Next, the tracking and feed operation will now be described. Like the focusing coils 28a, the tracking and feed coil 29a held on the bobbin 21a is located in the magnetic circuit constituted by the actuator magnet 26, the back yoke 27 and the guide shaft 25. When the tracking and feed actuator coils 29a are energized, the bobbin 21a and the objective lens 22 are driven, together with the tracking and feed coils 29a, in the tracking/feed direction (direction of the arrow D) by an electromagnetic effect. The objective lens 22 can be moved radially of the optical disk 1 over the entire recording area of the optical disk 1 by this tracking and feed drive. The main shaft sliders 30 and the guide sliders 31, movable radially of the optical disk 1 together with the bobbin 21a holding the objective lens 22, are slidably mounted respectively on the pair of guide shafts 25, and are connected to the bobbin 21a by the suspension springs 32a. With this arrangement, the main shaft sliders 30 and the guide sliders 31 movable together with the objective lens 22 can be lightweight, and with this lightweight design, the bobbin 21a can be moved at high speed together with the main shaft sliders 30 and the guide sliders 31, and therefore the tracking drive portion and the feed drive portion can be jointly constituted by one drive portion.

With respect to the spindle drive, when the spindle coil 36 shown in FIG. 8 is energized, the turntable 38 is rotated together with the optical disk 1 by an electromagnetic effect achieved by the cooperation of the spindle coil 36 with the spindle magnet 39.

By the above focusing drive, tracking and feed drive, and spindle drive, the data recorded on the optical disk 1 is reproduced.

As described above, in this embodiment, the optical system, including the laser unit 20 for emitting and detecting a laser beam and the objective lens 22 for converging the laser beam from the laser unit 20 onto the optical disk 1, is integrally mounted on the bobbin 21a. Therefore, there will not occur a change of the position of the objective lens 22 relative to the laser unit 20 in accordance with the movement of the bobbin 21a, which change has been encountered in the prior types of construction in which only an objective lens is mounted on a bobbin movable along an optical disk. Therefore, a high-precision manufacture of the guide members for the bobbin 21a, as well as a position adjustment, is less severe, and the optical performance is enhanced, and the assembling can be simplified. Furthermore, the focusing coils 28a and the tracking and feed coils 29a are mounted on the bobbin 21a holding the objective lens 22, and both the tracking drive and the feed drive are effected by the tracking and feed coils 29a, and the magnetic circuit for effecting the focusing drive, the tracking drive and the feed drive constituted by the actuator magnet 26, the back yoke 27 and the guide shaft 25. Therefore, the actuator can be of a compact size, and the optical disk unit is reliable and inexpensive.

Figure 10:
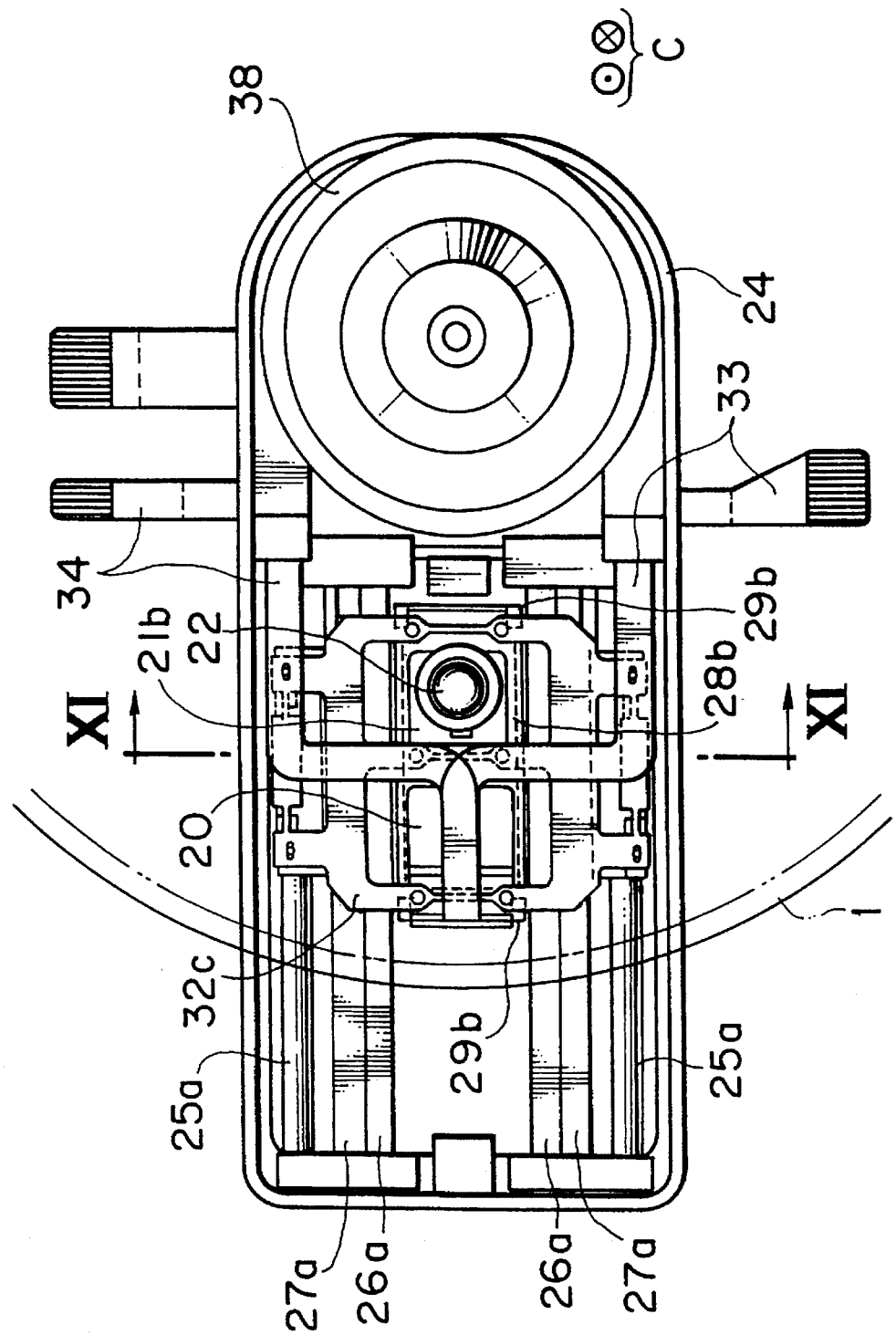
FIG. 10 is a plan view of a modified optical disk unit of the invention.
Figure 11:
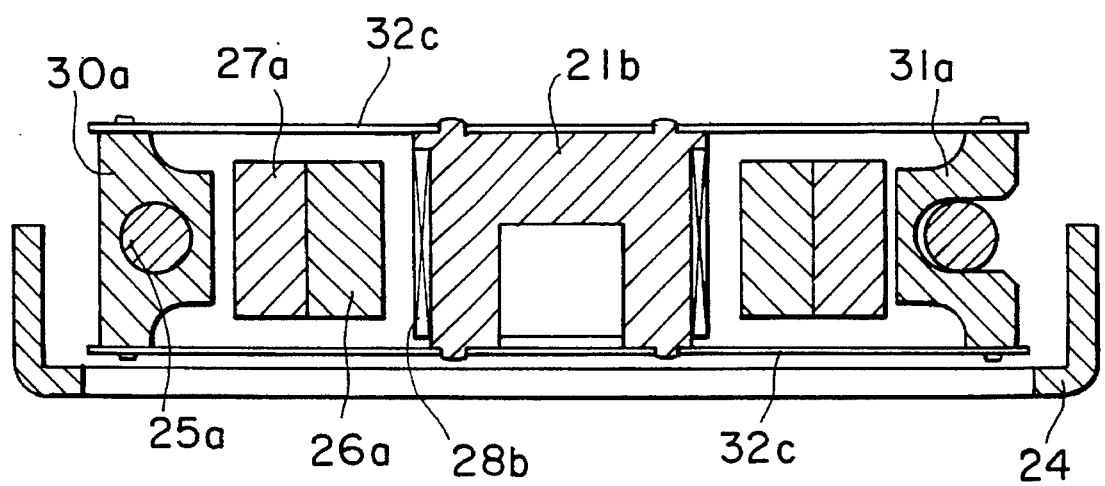
FIG. 11 is a cross-sectional view taken along the line XI—XI of FIG. 10.

In the first embodiment, although the focusing coils 28a and the tracking and feed coil 29a are located in the magnetic circuit constituted by the actuator magnet 26, the back yoke 27 and the guide shaft 25, it is also contemplated that a focusing coil 28b and a tracking and feed coil 29b in FIGS. 10 and 11 be located in a circuit subjected to a magnetic influence of an actuator magnet 26a. In the first embodiment, the pair of guide shafts 25 extend through the tracking and feed coils 29a, respectively, and the actuator magnet 26 and the back yoke 27 are provided outwardly of each of the pair of guide shafts 25. However, as shown in FIGS. 10 and 11, an actuator magnet 26a and a back yoke 27a may be provided inwardly of each of a pair of guide shafts 25a, in which case a bobbin 2lb, suspension springs 32c, main shaft sliders 30a and guide sliders 31a are arranged as illustrated.

As described above, in the present invention, the optical disk unit comprises the bobbin having the light converging means for converging light onto the loaded optical disk, the pair of guide members provided respectively on the opposite sides of the bobbin for guiding the bobbin radially of the optical disk, the pair of slide members slidably mounted on each of the guide members, the connecting members connecting the bobbin to the slide members in a manner to allow the bobbin to move in a direction perpendicular to the surface of the optical disk, the focusing drive means for moving the bobbin in a direction perpendicular to the surface of the optical disk, and the tracking and feed drive means for moving the bobbin along the guide members. In this construction, the slide members mounted on the pair of guide members are connected together by the bobbin and the connecting members, and therefore the slide members, movable with the bobbin in the direction radially of the optical disk, can be lightweight, and the slide members and the bobbin can be moved radially of the optical disk only by the tracking and feed drive means mounted on the bobbin. Therefore, the optical disk unit can be of a small-size and lightweight construction.

Second Embodiment

Figure 12:
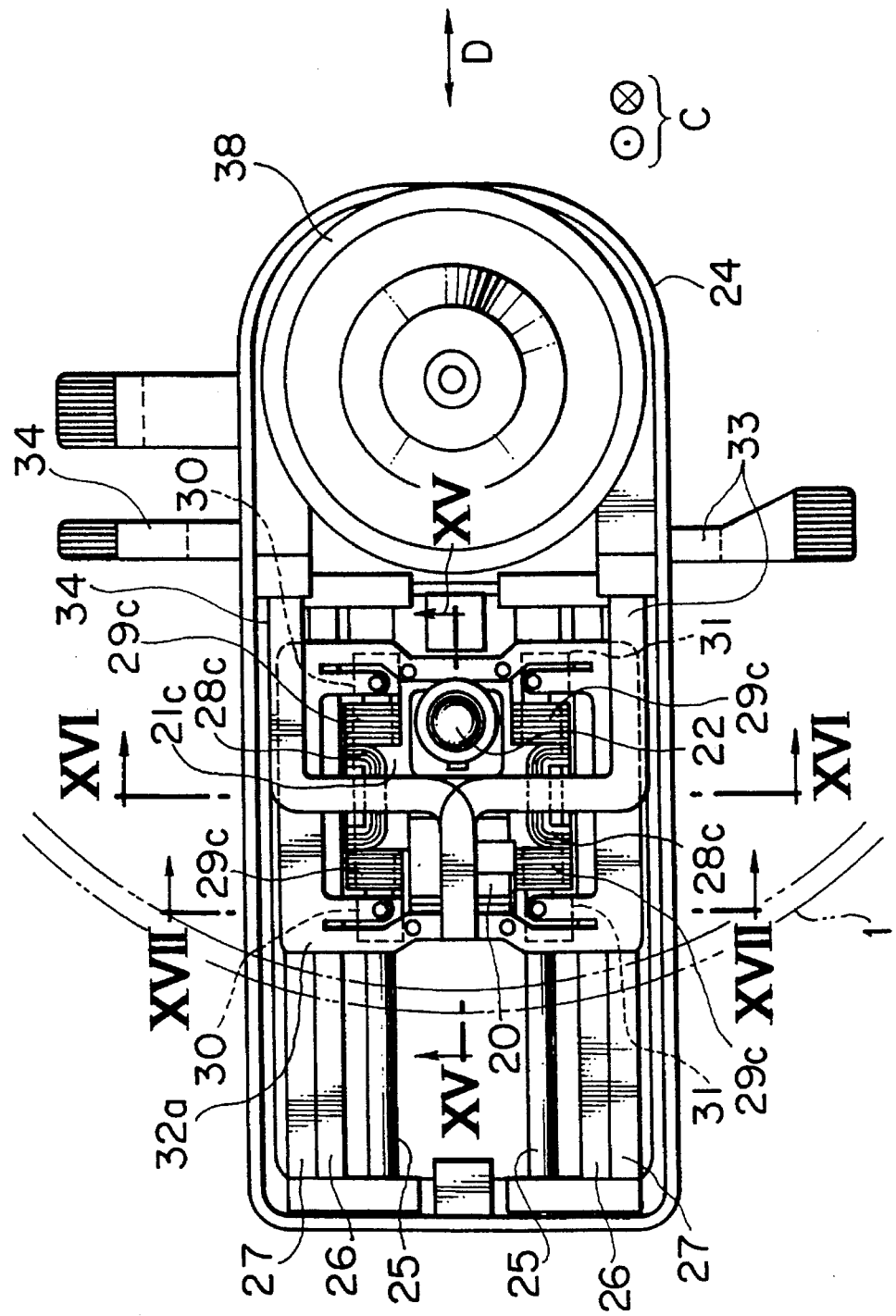
FIG. 12 is a plan view of a second embodiment of an optical disk unit of the present invention.
Figure 13:
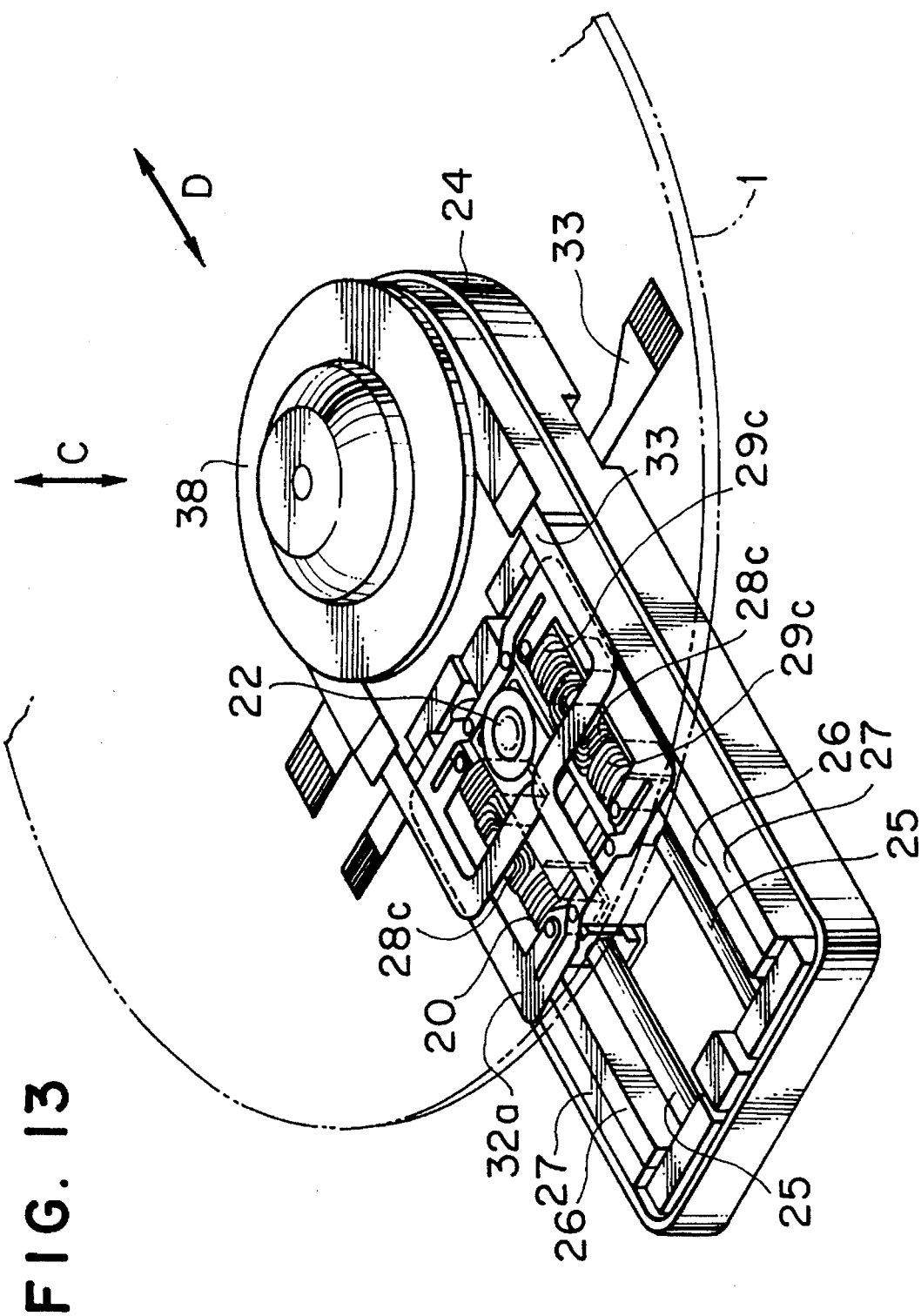
FIG. 13 is a perspective view of the optical disk unit of the second embodiment.
Figure 14:
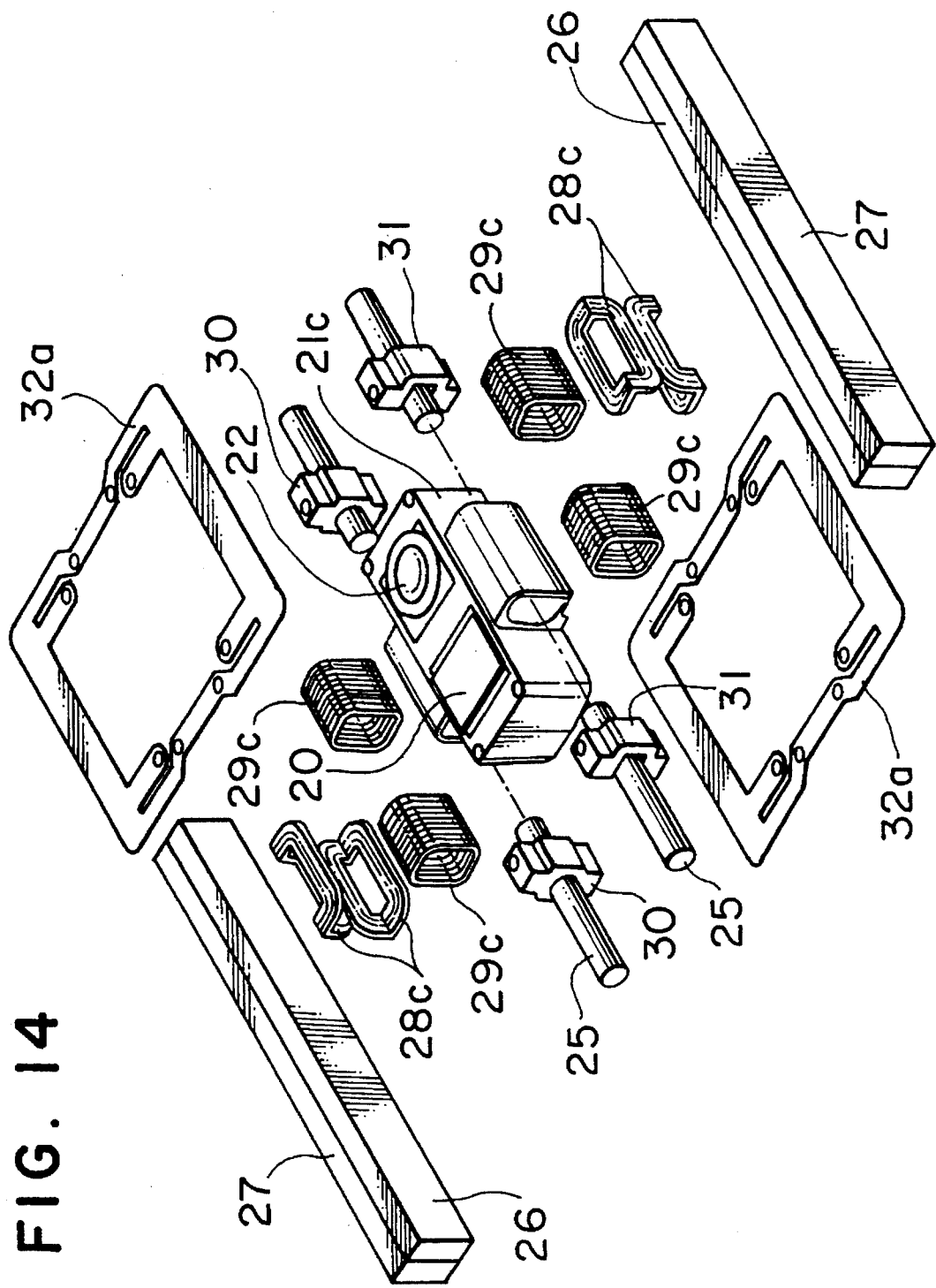
FIG. 14 is an exploded perspective view of the optical disk unit of the second embodiment.
Figure 15:
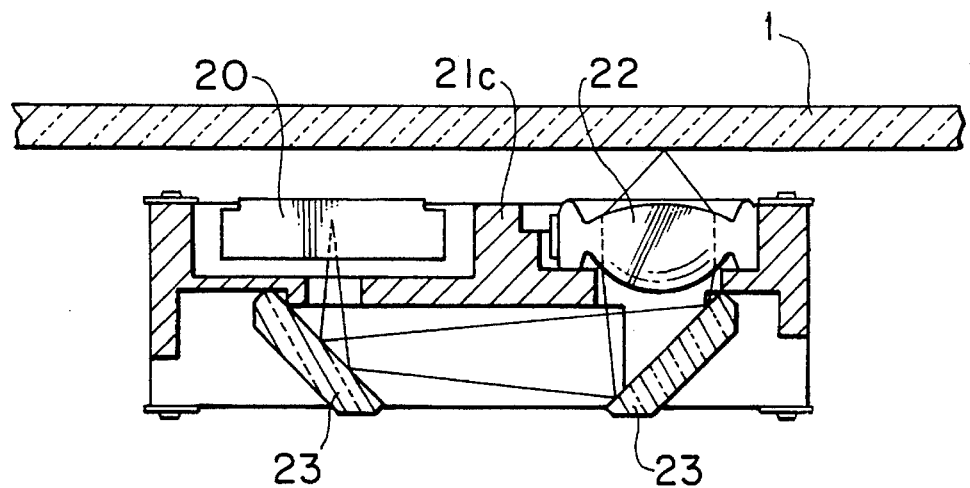
FIG. 15 is a cross-sectional view of the optical disk unit of the second embodiment taken along the line XV—XV of FIG. 12.
Figure 16:
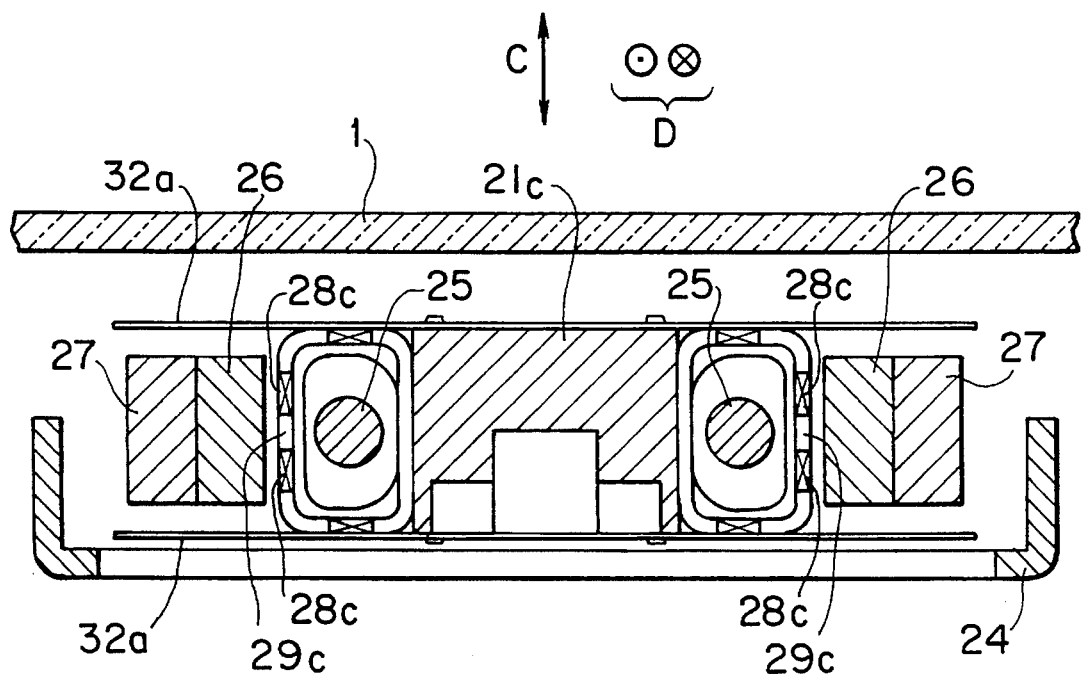
FIG. 16 is a cross-sectional view of the optical disk unit of the second embodiment taken along the line XVI—XVI of FIG. 12.
Figure 17:
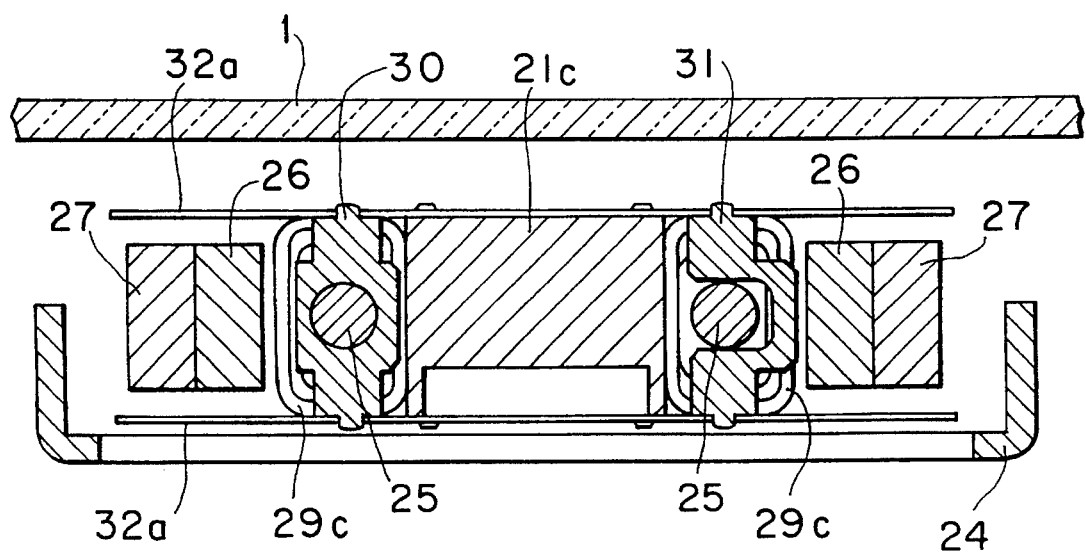
FIG. 17 is a cross-sectional view of the optical disk unit of the second embodiment taken along the line XVII—XVII of FIG. 12.

A second embodiment of the present invention will now be described with reference to the drawings. FIG. 12 is a plan view of the second embodiment of an optical disk unit of the present invention. FIG. 13 is a perspective view of the optical disk unit of the second embodiment. FIG. 14 is an exploded perspective view of the optical disk unit of the second embodiment, and FIGS. 15, 16 and 17 are cross-sectional views taken along the lines XV—XV, XVI—XVI and XVII—XVII of FIG. 12, respectively. In FIGS. 12, 13 and 14, reference numeral 21c denotes a bobbin. A laser unit 20 for emitting and detecting a laser beam shown in FIG. 15, an objective lens 22 for converging the laser beam onto an optical disk 1, and a pair of reflecting mirrors 23 for directing the laser beam, emitted from the laser unit 20, to the objective lens 22, are mounted on the bobbin 21c. Even if only one or none of the reflecting mirrors 23 is provided, the foregoing layout of the laser unit 20 and the objective lens 22 is possible. Two guide shafts 25 are mounted on a carriage base 24, and extend radially of the optical disk 1. Actuator magnets 26 for moving the bobbin 21c are mounted on the carriage base 24 in parallel relation to the guide shafts 25. A back yoke 27, made of a ferromagnetic material, is fixedly secured to each of the actuator magnets 26 in contiguous relation thereto. In this embodiment, the guide shafts 25 are made of a ferromagnetic material, and with this construction the guide shaft 25, the actuator magnet 26 and the back yoke 27 constitute a magnetic circuit. Focusing coils 28c for moving the bobbin 21c in a focusing direction (direction of the arrow C (FIG. 13)) are fixedly mounted on the bobbin 21c in opposed relation to the corresponding actuator magnets 26, as shown in FIG. 16. Tracking and feed coils 29c for moving the bobbin 21c in a tracking/feed direction (direction of the arrow D (FIG. 12)) are fixedly mounted on the bobbin 21c, and are disposed in opposed relation to the corresponding actuator magnets 26. The guide shafts 25 pass through the corresponding tracking and feed coils 29c. Main shaft sliders 30 and guide sliders 31 are supported on the guide shafts 25, respectively. As shown in FIG. 17, the main shaft sliders 30 are slidable along one guide shaft 25, and the guide sliders 31 are slidable along the other guide shaft 25. Sliders 30 and 31 are movable along the surface of the optical disk 1 in a direction perpendicular to the axis of guide shaft 25. Suspension springs 32a are fixedly secured to the bobbin 21c and to the main shaft sliders 30 and the guide sliders 31, as shown in FIG. 17. Bobbin 21c is resiliently supported by suspension springs 32a for movement in the focusing direction (direction of the arrow C (FIG. 13)). A signal flexible cable 33 for transferring an electrical signal for controlling the disk unit between a control board and the laser unit 20 is connected to the laser unit 20, and is fixed to the carriage base 24. An actuator flexible cable 34 for transferring signals from the control panel to the focusing coils 28c and the tracking and feed coils 29c is connected to the focusing coils 28c and the tracking and feed coils 29c, and is fixed to the carriage base 24.

The operation of the optical disk unit of the above construction will now be described. A laser beam, emitted from a semiconductor laser provided at the laser unit 20, is reflected by the pair of reflecting mirrors 23, and is fed to the objective lens 22, as shown in FIG. 15. The laser beam is converged or decreased in diameter by the objective lens 22 so that data can be read from the optical disk 1. Reflection light from the optical disk 1 passes through the objective lens 22, and is reflected by the reflecting mirrors 23 to a photo detector provided at the laser unit 20, and is outputted as an electrical signal.

Next, the focusing operation for detecting the data recorded on the optical disk 1 will be described. The focusing coils 28c are located in the magnetic circuit constituted by the actuator magnet 26, the back yoke 27 and the guide shaft 25, as shown in FIG. 16. When the focusing coils 28c are energized, the bobbin 21c and the objective lens 22 are driven, together with the focusing coils 28c, in the focusing direction (direction of the arrow C) by an electromagnetic effect. At this time, since the bobbin 21c holding the objective lens 22 is supported on the main shaft sliders 30 and guide sliders 31 through the pair of upper and lower suspension springs 32a, the main shaft sliders 30 are angularly moved about the guide shaft 25, and the guide sliders 31 are angularly moved about the guide shaft 25, and also are moved in a direction perpendicular to the axis of the guide shaft 25. As a result, the suspension springs 32a are deformed, so that the bobbin 21c moves in the focusing direction (direction of the arrow C). In the second embodiment, each of the upper and lower suspension springs 32a is of such a construction that a spring portion, interconnecting the bobbin 21c and the main shaft sliders 30, is integral with a spring portion interconnecting the bobbin 21c and the guide sliders 31. However, this suspension spring may be of a construction that a spring portion interconnecting the bobbin 21c and the main shaft sliders 30 is separate from a spring portion interconnecting the bobbin 21c and the guide sliders 30.

Next, the tracking and feed operation will be described. Like the focusing coils 28c, the tracking and feed coils 29c, held on the bobbin 21c, are located in the magnetic circuit constituted by the actuator magnet 26, the back yoke 27 and the guide shaft 25. When the tracking and feed actuator coils 29c are energized, the bobbin 21c and the objective lens 22 are driven, together with the tracking and feed coils 29c, in the tracking/feed direction (direction of the arrow D) by an electromagnetic effect. The tracking and feed coils 29c are mounted on the bobbin 21c so that those surfaces of the tracking and feed coils 29c facing the actuator magnet 26 and those surfaces of the focusing coils 28c facing the actuator magnet 26 are disposed in a common plane. Therefore, the spacing between the actuator magnet 26 and the guide shaft 25 can be reduced, and a magnetic flux density acting on the focusing coils 28c and the tracking and feed coils 29c is increased, thus enhancing the driving efficiency of the actuator. The objective lens 22 can be moved radially of the optical disk 1 over the entire recording area of the optical disk 1 by this tracking and feed operation. The main shaft sliders 30 and the guide sliders 31, movable radially of the optical disk 1 together with the bobbin 21c holding the objective lens 22, are slidably mounted respectively on the pair of guide shafts 25, and are connected to the bobbin 21c by the suspension springs 32a. With this arrangement, the main shaft sliders 30 and the guide sliders 31 are movable together with the objective lens 22, and can thus be compact and lightweight. With this lightweight design and the enhanced drive efficiency of the actuator, the bobbin 21c can be more stably driven at high speed together with the main shaft sliders 30 and the guide sliders 31 than in the first embodiment.

As described above, in the second embodiment, those surfaces of the focusing coils 28c facing the actuator magnet 26 and those surfaces of the tracking and feed coils 29c facing the actuator coil 26 are disposed in a common plane, and with this arrangement the spacing between the actuator magnet 26 and the guide shaft 25 can be reduced. Therefore the actuator can have a higher drive efficiency, and can be of a smaller size than in the first embodiment. Therefore, the optical disk unit is highly reliable and inexpensive.

Figure 18:
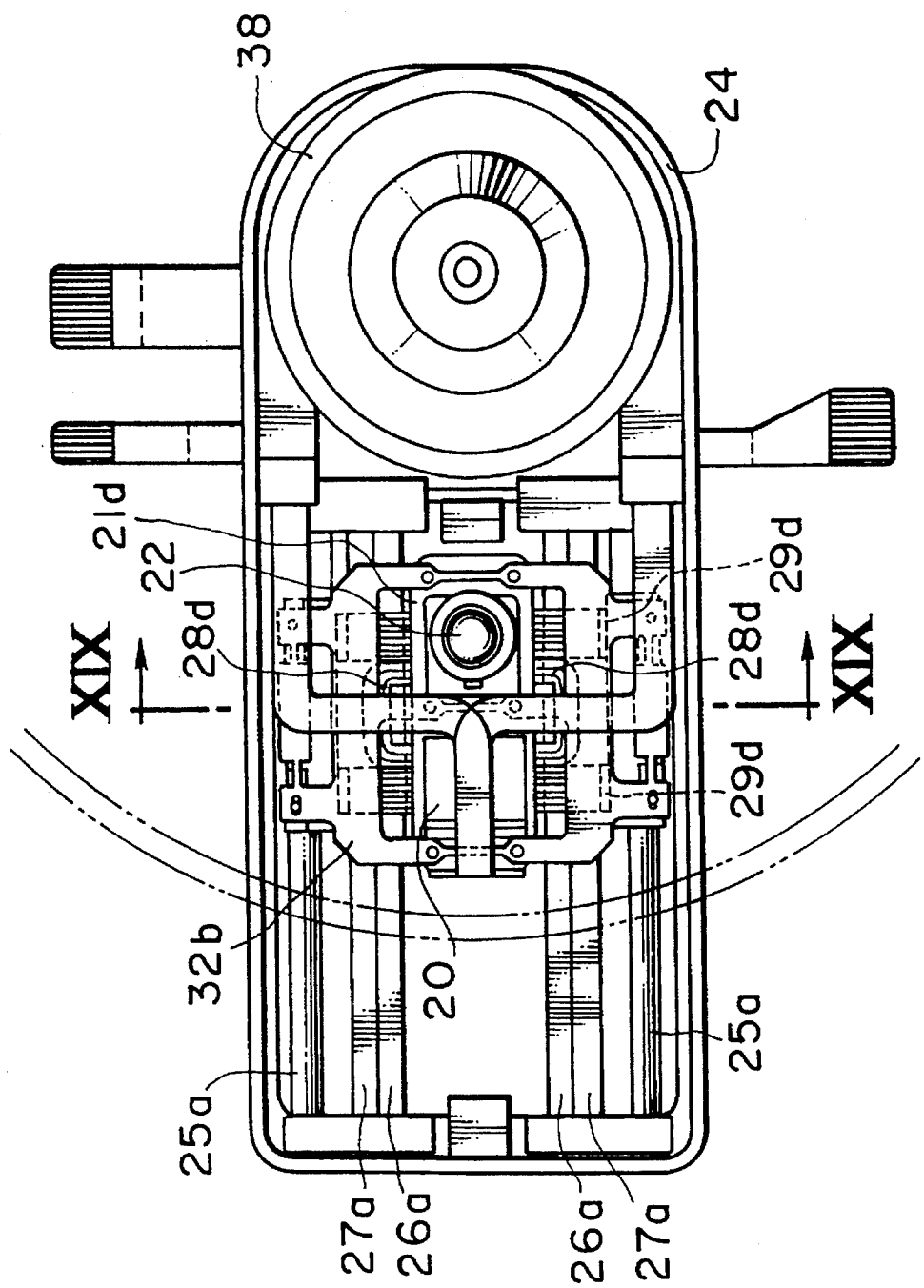
FIG. 18 is a plan view of a modified optical disk unit of the invention.
Figure 19:
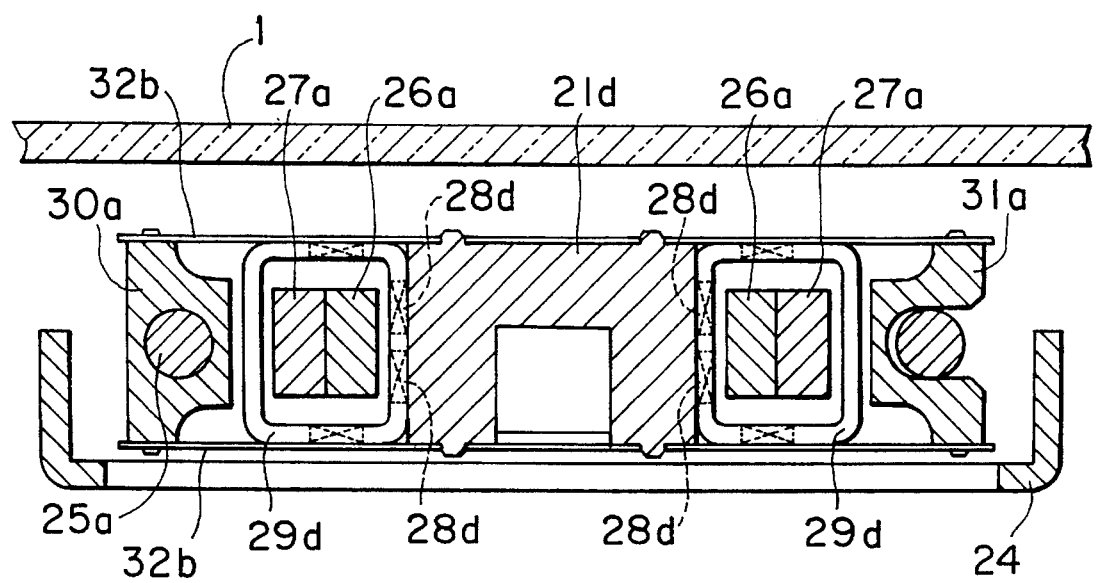
FIG. 19 is a cross-sectional view taken along the line XIX—XIX of FIG. 18.
Figure 20:
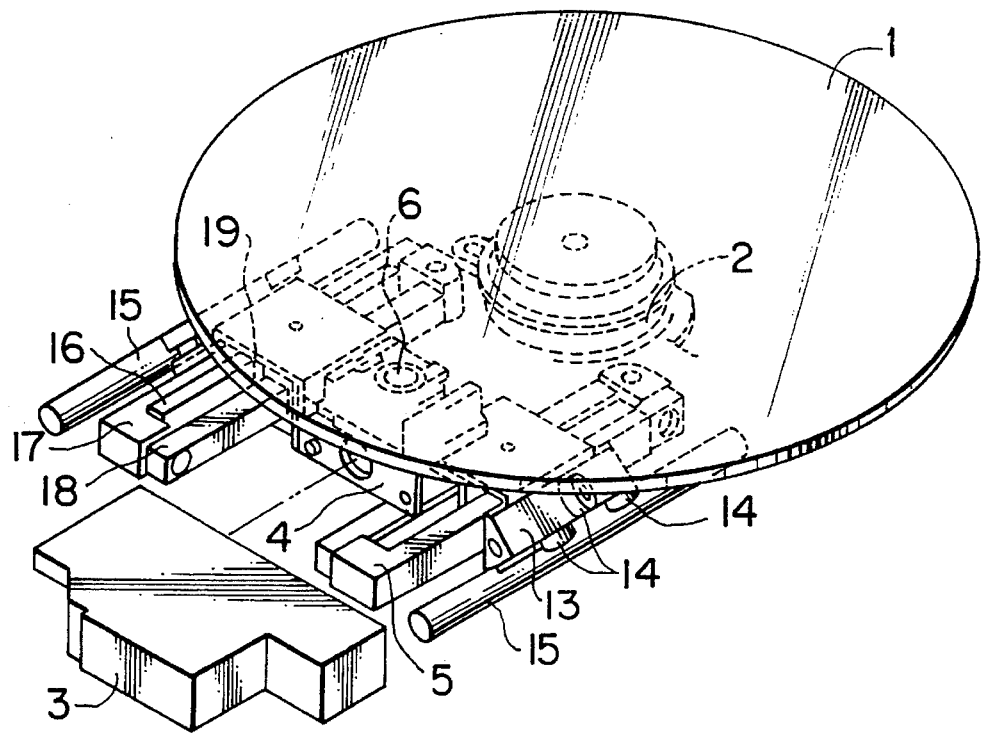
FIG. 20 is a view showing important portions of the conventional optical disk unit.
Figure 21:
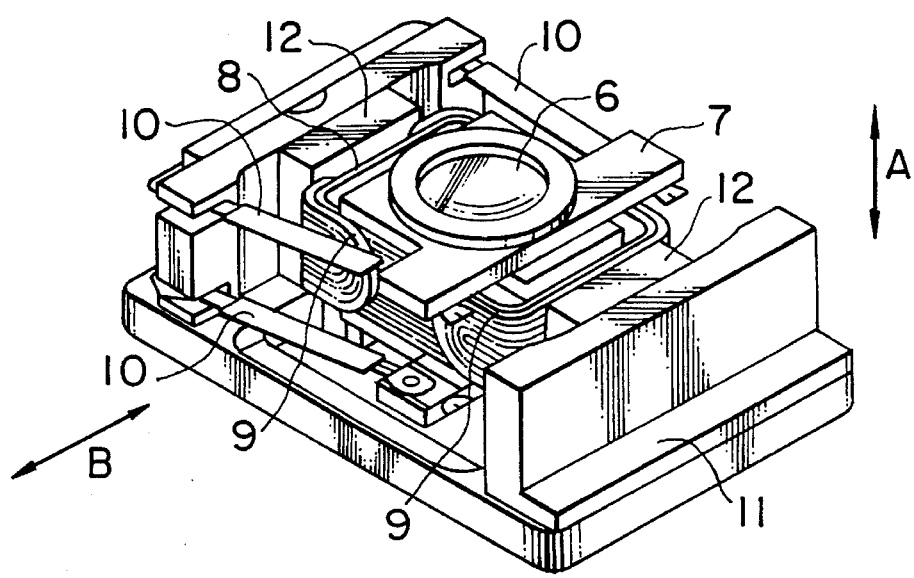
FIG. 21 is a view showing a pickup head of the conventional optical disk unit.

In the second embodiment, although the focusing coils 28c and the tracking and feed coil 29c are located in the magnetic circuit constituted by the actuator magnet 26, the back yoke 27 and the guide shaft 25, it is only necessary that the focusing coils and the tracking and feed coils shown as at 28d and 29d in FIGS. 18 and 19 be located in a circuit subjected to a magnetic influence of an actuator magnet 26a, and that those surfaces of the focusing coils 28d and the tracking and feed coils 29d facing the actuator magnet 26a be disposed in a common plane. In the second embodiment, the pair of guide shafts 25 extend through the corresponding tracking and feed coils 29c, and the actuator magnet 26 and the back yoke 27 are provided outwardly of each of the pair of guide shafts 25; however, as shown in FIGS. 18 and 19, an actuator magnet 26a and a back yoke 27a may be provided inwardly of each of a pair of guide shafts 25a.

As described above, in the present invention, the optical system, including the means for emitting and detecting a laser beam and the objective lens for converging the laser beam onto the optical disk, is integrally mounted on the bobbin. Therefore, there will not occur a change of the position of the objective lens relative to the laser beam emitting and detecting means in accordance with the movement of the bobbin, which change has been encountered in the type of construction in which only an objective lens is mounted on a bobbin. Therefore, a high-precision manufacture of the guide members for the bobbin, as well as a position adjustment, is less severe, and the optical performance is enhanced, and the assembling can be simplified. Furthermore, the focusing coils and the tracking and feed coils are mounted on the bobbin holding the objective lens, and the tracking drive and the feed drive are effected by the tracking and feed coils, and the magnetic circuit for effecting the focusing drive, the tracking drive and the feed drive is constituted by the single magnetic circuit means. Moreover, those surfaces of the focusing coils facing the actuator magnet and those surfaces of the tracking and feed coils facing the actuator magnet are disposed in a common plane. Therefore, the magnetic circuit constituted by the actuator magnet can be highly efficient, and the actuator can be of a compact size, and there can be provided the optical disk unit which is reliable and inexpensive.

What is claimed is:

1. An optical disc unit, comprising:
   a bobbin having means for emitting and detecting light and means for converging light, said means for emitting and detecting light and said means for converging light being integrally located within said bobbin;
   first and second shafts each mounted on a respective opposite side of said bobbin, said first and second shafts guiding said bobbin in a direction radial to a recording medium;
   a first pair of sliders mounted on said first shaft, one of said first pair of sliders being positioned forwardly of said bobbin, and the other of said first pair of sliders being positioned rearwardly of said bobbin, each of said first pairs of sliders being rotatable about and slidable on said first shaft;
   a second pair of sliders mounted on said second shaft, one of said second pair of sliders being positioned forwardly of said bobbin, and the other of said second pair of sliders being positioned rearwardly of said bobbin, each of said second pairs of sliders being rotatable about and slidable on said second shaft, said second pair of sliders further being movable in a direction perpendicular to said second shaft;
   a plurality of suspension springs fixedly secured to said first and second pairs of sliders, said suspension springs holding said bobbin so that said bobbin is movable in a direction perpendicular to a surface of the recording medium;
   first and second actuator magnets each respectively mounted parallel and adjacent to said first and second shafts;
   focusing drive means comprising first and second focusing coils each mounted on a respective opposite sides of said bobbin adjacent to a respective actuator magnet, said focusing coils being energizable for moving said bobbin in the direction perpendicular to the surface of the recording medium so that said first pair of sliders are rotated about said first shaft and said second pair of sliders are rotated about said second shaft and moved in the direction perpendicular to said second shaft; and
   tracking drive means comprising first and second tracking-and-feed coils each mounted on a the respective opposite sides of said bobbin adjacent to the respective actuator magnet, said tracking-and-feed coils being energizable for moving said bobbin and said sliders along said first and second shafts.

2. An optical disc unit as defined in claim 1, further comprising magnetic field generating means for applying a magnetic field to said focusing coils and to said tracking-and-feed coils.

3. An optical disc unit as defined in claim 2, wherein at least one of said first shaft, said second shaft, and said magnetic field generating means extends through said tracking-and-feed coils.

* * * * *